United States Patent
Hobbs et al.

(10) Patent No.: US 9,970,589 B2
(45) Date of Patent: May 15, 2018

(54) EXPANDABLE SOCKETS FOR USE WITH PORTABLE MEDIA PLAYERS

(71) Applicant: POPSOCKETS LLC, Boulder, CO (US)

(72) Inventors: Molly M. Hobbs, Boulder, CO (US); David B. Barnett, Boulder, CO (US)

(73) Assignee: POPSOCKETS LLC, Boulder, CO (US)

( * ) Notice: Subject to any disclaimer, the term of this patent is extended or adjusted under 35 U.S.C. 154(b) by 0 days. days.

(21) Appl. No.: 15/808,076

(22) Filed: Nov. 9, 2017

(65) Prior Publication Data

US 2018/0066791 A1    Mar. 8, 2018

Related U.S. Application Data

(63) Continuation of application No. 15/679,934, filed on Aug. 17, 2017, which is a continuation of application No. 15/615,900, filed on Jun. 7, 2017.

(60) Provisional application No. 62/376,237, filed on Aug. 17, 2016.

(51) Int. Cl.
| | |
|---|---|
| *F16M 11/10* | (2006.01) |
| *F16M 11/06* | (2006.01) |
| *F16M 13/00* | (2006.01) |
| *F16M 11/40* | (2006.01) |
| *G06F 1/16* | (2006.01) |

(52) U.S. Cl.
CPC ............. *F16M 11/06* (2013.01); *F16M 11/40* (2013.01); *F16M 13/00* (2013.01); *G06F 1/1626* (2013.01)

(58) Field of Classification Search
USPC .......................................... 455/575.8, 575.1
See application file for complete search history.

(56) References Cited

U.S. PATENT DOCUMENTS

| | | | | |
|---|---|---|---|---|
| 1,590,823 | A | * | 6/1926 | Hewitt .................. H01R 13/33 |
| | | | | 200/51 R |
| 2,876,979 | A | | 3/1959 | Barbera |
| 3,425,595 | A | | 2/1969 | Shapira |

(Continued)

FOREIGN PATENT DOCUMENTS

| | | |
|---|---|---|
| CN | 101087317 A | 12/2007 |
| CN | 101090617 A | 12/2007 |
| GB | 2316263 A | 2/1998 |

OTHER PUBLICATIONS

Petition for Inter Partes Review of U.S. Pat. No. 8,560,031, US Patent and Trademark Office, Before the Patent Trial and Appeal Board, *Quest USA Corp.* v. *PopSockets LLC*, Case No. IPR2018-00497, Jan. 15, 2018.

(Continued)

*Primary Examiner* — Ganiyu A Hanidu
(74) *Attorney, Agent, or Firm* — Marshall, Gerstein & Borun LLP

(57) ABSTRACT

An expandable socket for attachment to a portable media player or a portable media player case. The expandable socket generally includes a platform, a button spaced from the platform, and a collapsible mechanism coupled to the platform and the button. The platform is adapted to engage a portion of the portable media player or the portable media player case. The collapsible mechanism includes a plurality of discrete sections movable relative to one another to move the expandable socket between a collapsed configuration and an expanded configuration.

25 Claims, 3 Drawing Sheets

(56) References Cited

U.S. PATENT DOCUMENTS

| | | | |
|---|---|---|---|
| 3,781,922 A | 1/1974 | Ericson | |
| 4,878,863 A * | 11/1989 | Swengel, Jr. | H01R 13/24 |
| | | | 439/884 |
| 4,927,191 A | 5/1990 | Mikol | |
| 4,955,493 A | 9/1990 | Touzani | |
| 5,568,549 A | 10/1996 | Wang | |
| 5,807,144 A * | 9/1998 | Sivard | A61N 1/3752 |
| | | | 439/816 |
| 6,196,850 B1 | 3/2001 | Dietz et al. | |
| D471,547 S | 3/2003 | Ruohonen | |
| 6,736,285 B2 | 5/2004 | Stewart-Stand | |
| 6,776,660 B1 | 8/2004 | Kubota et al. | |
| 6,781,522 B2 | 8/2004 | Sleva et al. | |
| D532,004 S | 11/2006 | Kettula et al. | |
| 7,324,156 B2 | 1/2008 | Lohr et al. | |
| D570,593 S | 6/2008 | Justiss | |
| 7,422,486 B2 | 9/2008 | Hoff et al. | |
| 7,540,788 B2 | 6/2009 | Murphy et al. | |
| 7,581,119 B2 | 8/2009 | Tupman et al. | |
| 7,644,895 B2 | 1/2010 | Tseng | |
| 7,678,271 B2 | 3/2010 | Curtin | |
| 7,782,610 B2 | 8/2010 | Diebel et al. | |
| 7,822,448 B2 | 10/2010 | Lin et al. | |
| 7,983,034 B1 | 7/2011 | Mohoney | |
| D647,085 S | 10/2011 | Chung et al. | |
| 8,078,224 B2 | 12/2011 | Fadell et al. | |
| 8,080,975 B2 | 12/2011 | Bessa et al. | |
| 8,186,642 B2 | 5/2012 | Weiss-Vons | |
| 8,317,046 B2 | 11/2012 | Vanderberg et al. | |
| 8,560,031 B2 | 10/2013 | Barnett et al. | |
| 8,737,066 B1 | 5/2014 | Block | |
| 8,844,098 B2 | 9/2014 | Karmatz | |
| 9,787,348 B2 | 10/2017 | Srour | |
| 2003/0214131 A1 * | 11/2003 | Kanao | F16L 21/002 |
| | | | 285/238 |
| 2005/0243522 A1 | 11/2005 | Nilsen et al. | |
| 2007/0010821 A1 * | 1/2007 | Wilkinson | A61B 17/1631 |
| | | | 606/86 A |
| 2007/0093786 A1 | 4/2007 | Goldsmith et al. | |
| 2007/0164036 A1 | 7/2007 | Brandenburg | |
| 2007/0293288 A1 | 12/2007 | Lin et al. | |
| 2008/0053770 A1 | 3/2008 | Tynyk | |
| 2008/0090443 A1 | 4/2008 | Ackloo | |
| 2008/0123287 A1 | 5/2008 | Rossell et al. | |
| 2008/0146958 A1 | 6/2008 | Guillory et al. | |
| 2008/0183275 A1 * | 7/2008 | Schmid | A61F 2/844 |
| | | | 623/1.15 |
| 2008/0221404 A1 | 9/2008 | Tso | |
| 2008/0273297 A1 | 11/2008 | Kumar | |
| 2009/0115367 A1 | 5/2009 | Kidakam | |
| 2009/0240297 A1 | 9/2009 | Shavit et al. | |
| 2010/0155550 A1 | 6/2010 | Weiss-Vons | |
| 2011/0015496 A1 | 1/2011 | Sherman et al. | |
| 2011/0036876 A1 | 2/2011 | Fathollahi | |
| 2011/0084081 A1 | 4/2011 | Chung et al. | |
| 2011/0117974 A1 | 5/2011 | Spitalnik et al. | |
| 2011/0252839 A1 | 10/2011 | Stevens | |
| 2011/0284547 A1 | 11/2011 | McElligott et al. | |
| 2011/0301439 A1 | 12/2011 | Albert et al. | |
| 2012/0042476 A1 | 2/2012 | Karmatz | |
| 2012/0329534 A1 * | 12/2012 | Barnett | F16M 11/10 |
| | | | 455/575.8 |
| 2013/0126691 A1 * | 5/2013 | Miklas | B60N 3/102 |
| | | | 248/311.2 |
| 2014/0317329 A1 | 10/2014 | Barnett et al. | |
| 2015/0077927 A1 | 3/2015 | Barnett et al. | |
| 2016/0209733 A1 * | 7/2016 | Akai | F16M 11/041 |
| 2017/0195000 A1 | 7/2017 | Srour | |

OTHER PUBLICATIONS

Exhibit 1004—Declaration of Dr. Glenn E. Vallee, Ph.D., P.E., to Petition for Inter Partes Review of U.S. Pat. No. 8,560,031, US Patent and Trademark Office, Before the Patent Trial and Appeal Board, *Quest USA Corp.* v. *PopSockets LLC*, Case No. IPR2018-00497, Jan. 15, 2018.

Exhibit 1011—Webster's Third New International Dictionary (2002), to Petition for Inter Partes Review of U.S. Pat. No. 8,560,031, US Patent and Trademark Office, Before the Patent Trial and Appeal Board, *Quest USA Corp.* v. *PopSockets LLC*, Case No. IPR2018-00497, Jan. 15, 2018.

Initial Determination and Recommended Determination in the Matter of Certain Collapsible Sockets for Mobile Electronic Devices and Components Thereof, Investigation No. 337-TA-1056 (U.S. International Trade Commission), Jan. 31, 2018.

* cited by examiner

EXPANDABLE SOCKETS FOR USE WITH PORTABLE MEDIA PLAYERS

CROSS-REFERENCE TO RELATED APPLICATIONS

This application is a continuation of U.S. application Ser. No. 15/679,934, filed Aug. 17, 2017, which claims priority under 35 U.S.C. § 119(e) to U.S. Provisional Application No. 62/376,237, filed Aug. 17, 2016, and is a continuation of U.S. application Ser. No. 15/615,900 filed Jun. 7, 2017, which claims priority under 35 U.S.C. § 119(e) to U.S. Provisional Application No. 62/376,237. The entire respective disclosures of each of the above-identified applications are incorporated herein by reference.

FIELD OF THE INVENTION

The present invention relates generally to expandable sockets and more particularly to expandable sockets, which may also be referred to as collapsible sockets, that can be attached to portable media players (e.g., smart phones, MP3 players) or portable media player cases and used as grips, stands, or for other purposes.

BACKGROUND

U.S. Pat. No. 8,560,031, which issued Oct. 15, 2013, and is hereby incorporated herein by reference, discloses extending sockets, formed of accordions generally with buttons attached at their distal ends, for attaching to portable media players or portable media player cases. The sockets are used to wrap cords, as grips or stands, and to attach the player to another object.

However, a need remains in the art for other designs of collapsible grips and stands.

SUMMARY

One aspect of the present invention provides an expandable socket for attachment to a portable media player or a portable media player case. The expandable socket includes a base adapted to engage a portion of the portable media player or the portable media player case, a cover coupled to the base, wherein the cover is movable between a collapsed position and an expanded position, a button coupled to the cover opposite the base, and a spring arranged within the cover between the base and the button.

Another aspect of the present invention provides an expandable socket for attachment to a portable media player or a portable media player case. The expandable socket includes a base adapted to engage a portion of the portable media player or the portable media player case, a button that is spaced from and movable relative to the base, and a spring disposed between the base and the button, the spring arranged to resist movement of the button toward the base.

Another aspect of the present invention provides an expandable socket for attachment to a portable media player or a portable media player case. The expandable socket includes a base adapted to engage a portion of the portable media player or the portable media player case, an elastomeric skin coupled to the base and having a hollow shape, the skin including at least one folded section and being deformable between a collapsed position and an expanded position, a button coupled to the skin opposite the base, the button being disposed a first distance from the base when the skin occupies the collapsed position and a second distance greater than the first distance from the base when the skin occupies the expanded position, and a spring arranged within the skin between the base and the button, the spring configured to resist movement of the skin from the expanded configuration.

DETAILED DESCRIPTION OF THE PREFERRED EMBODIMENTS

Figure 1A:
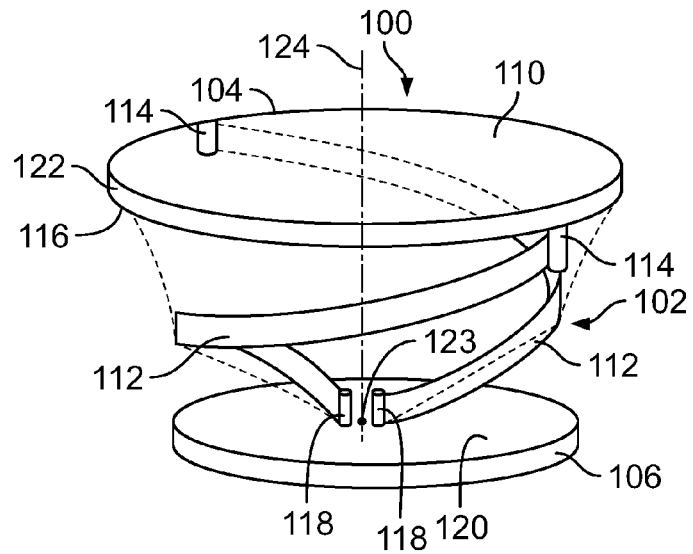
FIG. 1A is a side isometric, cutaway view of a first example of an expandable socket constructed in accordance with the teachings of the present invention, showing the socket in an expanded configuration.
Figure 1B:
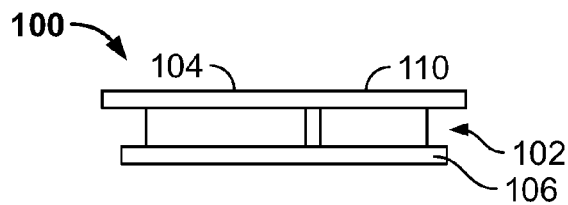
FIG. 1B is a side, cross-sectional view of FIG. 1A, showing the socket in a collapsed configuration.
Figure 2:
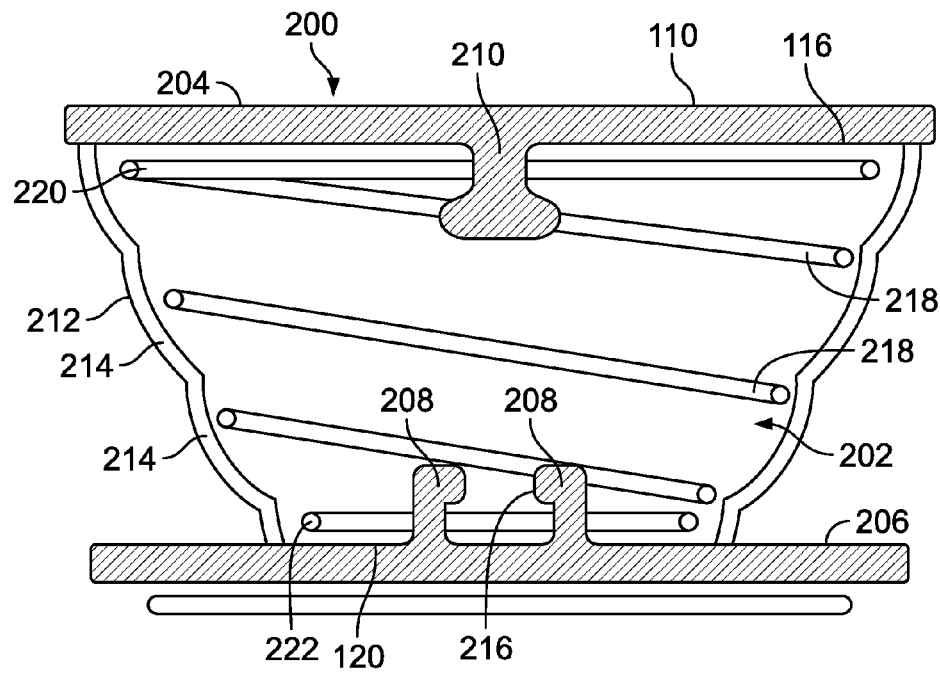
FIG. 2 is a side, cross-sectional view of a third example of an expandable socket constructed in accordance with the teachings of the present invention, showing the socket in an expanded configuration.

FIGS. 1A and 1B illustrate a first example of one example of an expandable socket 100 constructed in accordance with the teachings of the present invention. The expandable socket 100 in this example includes a button 104, a base 106, e.g., a platform, and a collapsible or expandable mechanism 102 coupled to and extending between the button 104 and the base 106. While removed from FIGS. 1A and 1B for clarity, the expandable socket 100 also includes a deformable cover (e.g., a cover as illustrated in FIG. 2) that is coupled to the button 104 and/or the base 106 in a manner that surrounds and houses (e.g., protects) the collapsible mechanism for safety and comfort. In other examples, the expandable socket 100 can include additional, different, and/or fewer components. As an example, the expandable socket 100 need not include the cover.

As best illustrated in FIG. 1A, the base 106 in this example has an annular shape. In other examples, however, the base 106 may instead have a rectangular, square, triangular, or other shape. The base 106 is preferably made of metal or plastic, though other suitable materials (e.g., cardboard) can be used. In any case, the base 106 is generally configured to be directly or indirectly coupled (e.g., attached, mounted) to a portable media player (e.g., an MP3 player, a smart phone, a tablet) or a case of such a portable media player. To this end, the base 106 can, in some cases, include a securing element known to one of ordinary skill in the art, such as, for example, adhesive, glue, tape, a suction cup, a snap-fit connection, a friction fit, other means, or combinations thereof. Alternatively, in other cases, the base 106 can be integrally formed with the portable media player or the case for the portable media player.

As best illustrated in FIG. 1A, the button 104 in this example has an annular shape. In other examples, however, the button 104 may have a rectangular, square, triangular, irregular, or other shape. The button 104 in this example also has an outer diameter that is larger than an outer diameter of the base 106, though this need not be the case. Like the base 106, the button 104 is preferably made of metal or plastic, though other suitable materials can be used. The button 104 has an outer side 110 that may, for example, include a design (including, e.g., a logo, text, graphics, a picture). In some cases, the design may be selected by a user of the expandable socket 100.

The collapsible or expandable mechanism 102 is generally configured to facilitate movement of the expandable socket 100 between an expanded configuration, illustrated in FIG. 1A, and a collapsed configuration, illustrated in FIG. 1B, and to retain the expandable socket 100 in the desired configuration (expanded or collapsed). In this example, the mechanism 102 takes the form of two, thin strip springs 112 arranged within the cover (not shown), with each spring 112 having a first end 114 coupled (e.g., mounted) to an inner side 116, i.e., an underside, of the button 104, and a second end 118 coupled (e.g., mounted) to an inner side 120 of the platform 106. The first end 114 of the each strip 112 is preferably coupled to the inner side 116 of the button 104 at or proximate to a perimeter edge 122 of the button 104, and the second end 118 of each strip 112 is preferably coupled to the inner side 116 of the platform 106 at or proximate to a center 123 of the platform 106. The first end 114 of each spring 112 may be removably coupled to the button 104, fixedly coupled to the button 104, or integrally formed with the button 104. Likewise, the second end 118 of each spring 112 may be removably coupled to the platform 106, fixedly coupled to the platform 106, or integrally formed with the platform 106.

In one example, the strips 112 are fabricated from spring steel or comparable metal. In another example, the strips 112 are produced from a stiff, flexible polymer. In any case, the strips 112 are preferably formed such that they are bistable, i.e., they each have two stable states in which they resist movement (at least initially), with one of the stable states being the expanded state shown in FIG. 1A, which corresponds to the expanded configuration of the expandable socket 100, and the other of the stable states being the collapsed state shown in FIG. 1B, which corresponds to the collapsed configuration of the expandable socket 100. Thus, when the strips 112 are in the expanded state shown in FIG. 1A, the strips 112 maintain (e.g., bias) the expandable socket 100 in the expanded configuration, and when the strips 112 are in the collapsed state shown in FIG. 1B, the strips 112 maintain (e.g., bias) the expandable socket 100 in the collapsed configuration.

In operation, the expandable socket 100 may be transitioned between the two configurations by manipulating the mechanism 102 between the two stable states. The mechanism 102 may be manipulated by grabbing or grasping the button 104 and rotating the button 104 about a longitudinal axis 124, which will in turn rotate the mechanism 102 coupled thereto about the same longitudinal axis 124, and/or grabbing or grasping the cover (not shown), which carries the mechanism 102, and rotating the cover about the longitudinal axis 124. The strips 112 will, in turn, rotate about the longitudinal axis 124, with the exact direction of rotation dependent upon whether the expandable socket 100 is being moved to the expanded configuration of FIG. 1A or the collapsed configuration of FIG. 1B. When, for example, the expandable socket 100 is moved from the expanded configuration of FIG. 1A to the collapsed configuration of FIG. 1B, the button 104 and the strips 112 will rotate in a first rotational direction (e.g., a counter-clockwise direction) about the longitudinal axis 124, thereby moving the button 104, the strips 112, and the cover toward the platform 106 along the longitudinal axis 124 in a first axial direction, and substantially reducing the profile of the expandable socket 100. Conversely, when the expandable socket 100 is moved from the collapsed configuration of FIG. 1B to the expanded configuration of FIG. 1A, the button 104, the strips 112, and the cover will rotate in a second direction, opposite the first direction, about the longitudinal axis 124, thereby moving the button 104, the strips 112, and the cover away from the platform 106 along the longitudinal axis 124 in a second axial direction opposite the first axial direction. Thus, the button 104 is spaced from the platform 106 so as to permit the user of the expandable socket 100 to wrap a headphone cord of the portable media player around a portion of the expandable socket 100, forming an adjustable stand for the portable media player, forming a grip for the portable media player, and/or to perform other desired functionality.

Figure 1C:
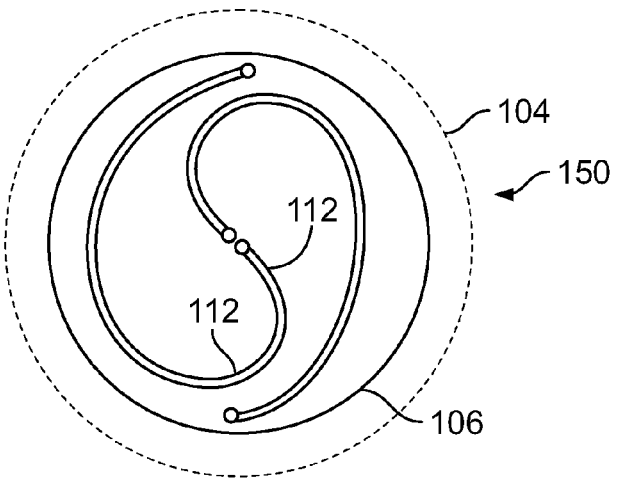
FIG. 1C is a top, cutaway view of a second example of an expandable socket constructed in accordance with the teachings of the present invention, showing the socket in a collapsed configuration.

FIG. 1C illustrates a second example an expandable socket 150 constructed in accordance with the teachings of the present invention. The expandable socket 150 is substantially similar to the expandable socket 100, in that it also includes the button 104, the platform 106, and the mechanism 102. However, in the expandable socket 150, the strips 112 are wrapped in the opposite direction from their path in the expandable socket 100. Thus, the expandable socket 150 may generally be transitioned between a collapsed configuration, shown in FIG. 1C, and an expanded configuration, not shown, by rotating the button 104 and/or the cover in a direction opposite how the button 104 and/or the cover are rotated in the expandable socket 100.

FIG. 2 illustrates a third example of an expandable socket 200 constructed in accordance with the teachings of the present invention. The expandable socket 200 generally includes a button 204, a base 206, a collapsible or expandable mechanism 202 coupled to and extending between the button 204 and the base 206, a deformable cover 212 that is coupled to the button 204 and/or the base 206 in a manner that surrounds and houses the collapsible mechanism 202 for safety and comfort, and a lock 214 configured to releasably secure the expandable socket 200 in a collapsed configuration that is not shown but is consistent with the collapsed configuration of the expandable socket 100 described above. In other examples, the expandable socket 200 may include additional, fewer, or different components. As an example, the expandable socket 200 may not include the cover 212.

The cover 212 is generally coupled to and disposed between the button 204 and the base 206. The cover 212 preferably takes the form of an elastomeric skin (made of an elastomeric material) that includes a plurality of folding sections 214 connected to one another between the button 204 and the base 206. In some examples, such as illustrated in FIG. 2, the plurality of folding sections 214 are arranged so as to form or a define a tapered conical shape that looks like an accordion. Thus, in these examples, the cover 212 has an outer diameter that tapers from the button 204 to the base 206 (though the opposite is possible as well). In other examples, the plurality of folding sections 214 may be arranged to form a different shape or the cover 212 may only include one folding section 214.

Like the collapsible mechanism 102, the collapsible mechanism 202 generally facilitates movement of the expandable socket 200 between an expanded configuration, illustrated in FIG. 2, and the collapsed configuration, not shown, and to retain the expandable socket 200 in the desired configuration (expanded or collapsed). However, the collapsible mechanism 202 in this example takes the form of a coil spring 218 (e.g., made of, for example, metal or plastic) that is arranged within the cover 212 between the button 204 and the base 206, such that the cover 212 surrounds and houses (e.g., protects) the coil spring 218. More particularly, the coil spring 218 has a first end 220 that is seated against the inner side 116 of the button 204 and a second end 222, opposite the first end 220, that is seated against the inner side 120 of the base 206. The coil spring 218 illustrated in FIG. 2 has a shape that substantially corresponds to the shape of the cover 212. In other words, the coil spring 218 illustrated in FIG. 2 has a conical or tapered shape, such that the first end 220 has an outer diameter that is larger than an outer diameter of the second end 222.

The button 204 in this example is similar to the button 104 described above, with common components referred to using common reference numerals. However, unlike the button 104, the button 204 also includes a first projection 210 that is carried by the and extends axially inward of and from the inner side 116 of the button 204. The base 206 in this example is likewise similar to the base 206 described above, with common components referred to using common reference numerals. However, unlike the base 106, the base 206 also includes a pair of second projections 208 that are carried by the inner side 120 of the base 206. The projections 208 extend axially inward from the inner side 120 of the base 206 before extending radially inward, thereby defining a recess 216 sized to receive the first projection 210.

As will be appreciated from FIG. 2, the coil spring 218 is arranged to bias the expandable socket 200 to its expanded configuration. More particularly, the coil spring 218 is arranged to bias the button 204 and the cover 212 away from the base 206 and to the positions shown in FIG. 2, which correspond to the expanded configuration of the expandable socket 200. Thus, the coil spring 218 may also be referred to herein as the biasing element 218. In any case, when the expandable socket 200 is in the expanded configuration, the button 204 is spaced from the platform 206 so as to permit the user of the expandable socket 200 to wrap a headphone cord of the portable media player around a portion of the expandable socket 200, forming an adjustable stand for the portable media player, forming a grip for the portable media player, and/or to perform other desired functionality.

The expandable socket 200 may be moved from this expanded configuration to the collapsed configuration by overcoming the biasing force applied by the coil spring 218. Generally speaking, the user of the expandable socket 200 may accomplish this by grabbing or grasping the button 204 and/or the cover 212 and moving (e.g., pushing) the button 204 and the cover 212 toward the platform 206 along a longitudinal axis 224. As the button 204 and the cover 212 are moved toward the platform 206 in this manner, the plurality of folding sections 214 fold onto one another and the button 204, the cover 212, and the coil spring 218 may rotate about the longitudinal axis 224.

As will also be appreciated from FIG. 2, the recess 216 is arranged to receive and retain the first projection 210 when the expandable socket 200 is moved to the collapsed configuration such that the button 204 is moved toward and into close proximity with the base 206. As this happens, the first projection 210 is moved past the second projections 208 and into the recess 216, at which time the second projections 208 engage the first projection 210 (and vice-versa). By virtue of the shape and size of the first projection 210 and the second projections 208, the first projection 210 is securely retained in the recess 216. In this manner, the first projection 210, the second projections 208, and the recess 216 define or form the lock 214 that locks the expandable socket 200 in the collapsed configuration.

One of ordinary skill in the art will appreciate that the first projection 210 and the second projections 208 can be reversed and yet still interact to help lock the Popsocket 200 in the collapsed configuration. More particularly, the first projection 210 can be carried by the base 206 and the second projections 208 (which define the recess 216) can be carried by the button 204.

The user of the expandable socket 200 may move the expandable socket 200 from the collapsed configuration to the expanded configuration by releasing the lock 214. Generally speaking, the user may release the lock 214 by grabbing or grasping and rotating the button 204 and/or the cover 212 about the longitudinal axis 224, which therefore rotates first projection 210 out of engagement with the second projections 208 and out of the recess 216. Once the lock 214 has been released, the biasing force of the coil spring 218 drives the button 204 and the cover 212 outward, away from the base 206, until the button 204 and the cover 212 reach the expanded configuration.

Figure 3A:
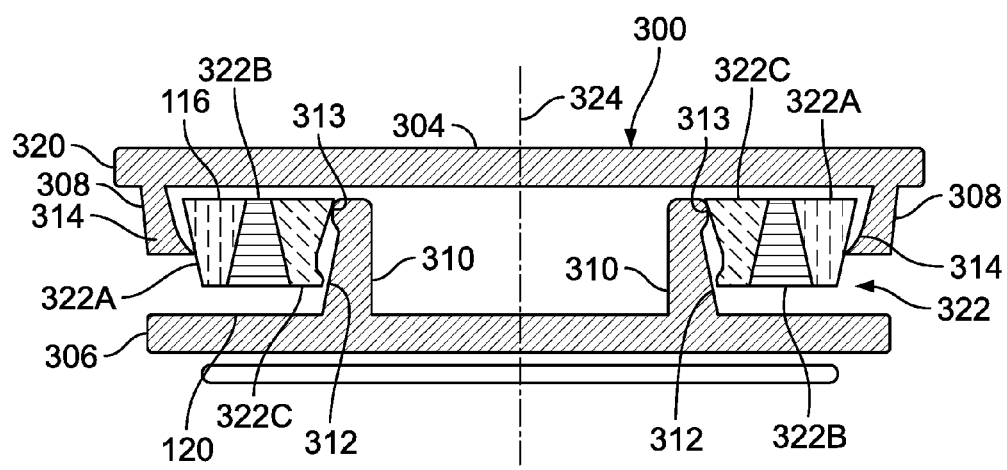
FIG. 3A is a side, cross-sectional view of a fourth example of an expandable socket constructed in accordance with the teachings of the present invention, showing the socket in a collapsed configuration.
Figure 3B:
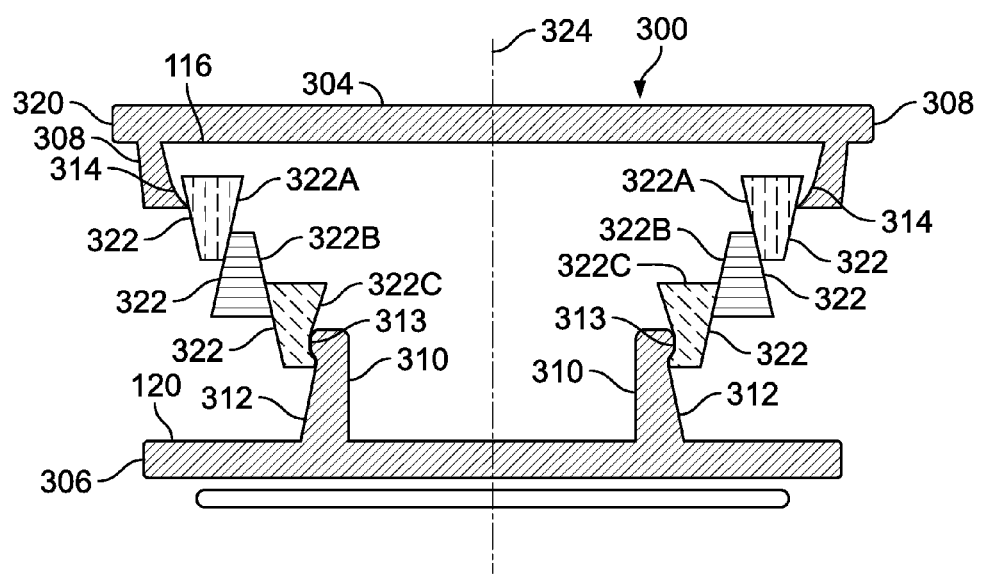
FIG. 3B is similar to FIG. 3A, but shows the socket in an expanded configuration.
Figure 3C:
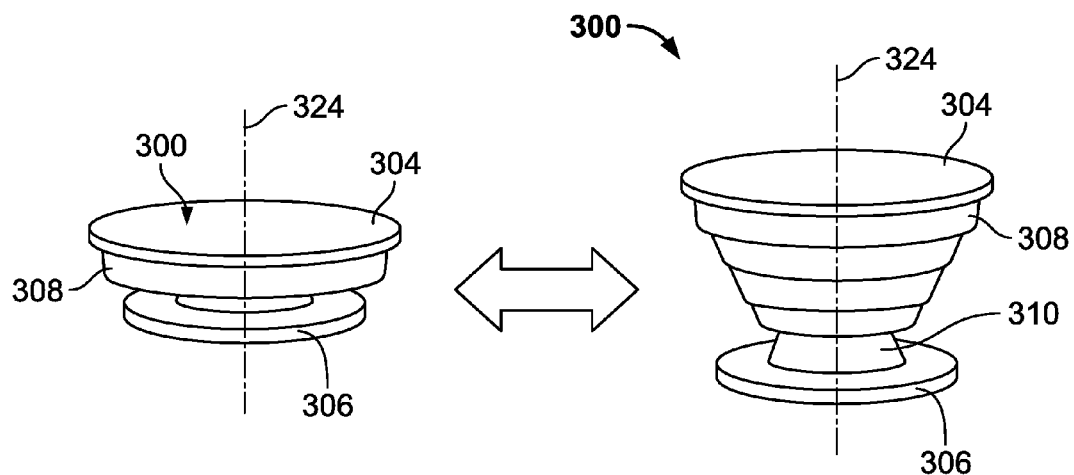
FIG. 3C is a side-by-side, perspective view of the socket of FIG. 3A and the socket of FIG. 3B.

FIGS. 3A-3C illustrate a fourth example of an expandable socket 300 constructed in accordance with the teachings of the present invention. The expandable socket 300 is similar to the expandable socket 200 in that it includes a button 304, a base 306, a collapsible or expandable mechanism 302 coupled to and extending between the button 304 and the base 306, and a lock configured to releasably secure the expandable socket 300 in an expanded configuration (shown in FIG. 3B), but is different from the expandable socket 200 in the manner described below. In other examples, the expandable socket 300 may include additional, fewer, or different components. As an example, the expandable socket 300 may also include a deformable cover such as the cover 212.

As with the collapsible mechanism 102 and the collapsible mechanism 202, the collapsible mechanism 302 generally facilitates movement of the expandable socket 300 between a collapsed configuration, shown in FIG. 3A, and the expanded configuration shown in FIG. 3B. However, the collapsible mechanism 302 in this example takes the form of a plurality of concentric rings 322 arranged between the button 304 and the base 306. In this example, the collapsible mechanism 302 includes three concentric rings 322A, 322B, and 322C each having a substantially wedge-shaped cross-section, though in other examples, more or less concentric rings may be employed and/or the concentric rings may have a different shape. In any case, the concentric rings 322 are movable relative one another along a longitudinal axis 324 as the expandable socket 300 moves between the collapsed and expanded configurations. Moreover, as illustrated in FIGS. 3A and 3B, the concentric ring 322B is movable within the concentric ring 322A and the concentric ring 322C is movable within the concentric ring 322B (and, in turn, the ring 322A) as the expandable socket 300 moves between the collapsed and expanded configurations.

The button 304 in this example is similar to the button 104 described above, with common components referred to using common reference numerals. However, unlike the button 104, the button 304 also includes a first, annular projection 308 that is carried by and extends axially inward of and from the inner side 116 of the button 304 at or proximate to a perimeter edge 320 of the button 304. The projection 308 in this example has an inner surface 314 that curves radially inward as the projection 308 extends away from the button 304. The inner surface 314 is therefore arranged to interface with an outermost one of the concentric rings 322 (the concentric ring 322A in this example) to help maintain the concentric rings 322 in the proper position between the button 304 and the base 306.

The base 306 in this example is similar to the base 106 described above, with common components referred to using common reference numerals. However, unlike the base 106, the base 306 includes a second, annular projection 310 that is carried by and extends axially inward of and from the inner side 120 of the base 106. The second projection 310 is disposed radially inward of both the first projection 308 and the concentric rings 322. In other words, the second projection 310 is nested within the first projection 308 and the concentric rings 322. The second projection 310 has an outer surface 312 that tapers as the projection 310 extends away from the base 306. A detent 313 is formed at or proximate to an end of the outer surface 312. The detent 313 is thus arranged to interface with an innermost one of the concentric rings 322 (the concentric ring 322C in this example) to help maintain the concentric rings 322 in the proper position between the button 304 and the base 306. In some examples, such as the one illustrated in FIGS. 3A and 3B, the innermost concentric ring 322 (322C in this example) may also include a groove that is sized to receive and interferingly engage the detent 313 in order to further help maintain the concentric rings 322 in the proper position.

In operation, the expandable socket 300 may be transitioned between the expanded and collapsed configurations by manipulating the button 304 and/or the mechanism 302. More particularly, the user of the expandable socket 300 may move the expandable socket 300 from the collapsed configuration (FIG. 3A) to the expanded configuration (FIG. 3B) by, for example, grabbing or grasping the button 304 and moving (e.g., pulling) the button 304 upward, away from the base 306, along the longitudinal axis 324. As briefly mentioned above, the expandable socket 300 includes a lock that may in turn lock, or securely retain, the expandable socket 300 in this expanded configuration. In this example, the lock is a friction-based lock that is defined by the detent 313 and the inner surface 315, which not only help to maintain the concentric rings 322 in the proper position between the button 304 and the base 306, but also respectively frictionally engage the innermost and outermost of the concentric rings 322 (322C and 322A, respectively, in this example) when the expandable socket 300 is in the expanded configuration In this example, the concentric rings 322 are also shaped so as to frictionally engage one or both adjacent concentric rings 322 when the expandable socket 300 is in the expanded configuration, thereby helping to lock the expandable socket 300 in the expanded configuration. The user of the expandable socket 300 may release or disengage these locking features, and move the expandable socket 300 from the expanded configuration to the collapsed configuration, by, for example, moving (e.g., pushing, pressing) the button 304 downward, toward the base 306, along the longitudinal axis 324. As the expandable socket 300 is moved from the expanded configuration to the collapsed configuration, the concentric rings 322 nest within one another, with the innermost ring 322 nesting within the next innermost ring 322 and so on, until the projection 310 is positioned immediately adjacent or in contact with the inner side 116 of the button 304.

The invention claimed is:

1. An expandable socket for attachment to a portable media player or a portable media player case, the expandable socket comprising:

a platform adapted to engage a portion of the portable media player or the portable media player case;

a button that is spaced from the platform;

a collapsible mechanism coupled to the platform and the button, the collapsible mechanism movable between a collapsed configuration to an expanded configuration, the collapsible mechanism including a plurality of at least partially coaxial rings that move relative to one another as the collapsible mechanism is moved from the expanded configuration to the collapsed configuration, wherein the plurality of at least partially coaxial rings are substantially concentrically arranged when the collapsible mechanism is in the collapsed configuration;

a first projection carried by the platform and arranged to extending radially inward to engage a portion of a first one of the partially coaxial rings to releasably secure the button to the collapsible mechanism; and a second projection carried by the platform and extending radially outward to engage a portion of a second one of the partially coaxial rings to releasably secure the platform to the collapsible mechanism.

2. An expandable socket for attachment to a portable media player or a portable media player case, the expandable socket comprising:

a platform adapted to engage a portion of the portable media player or the portable media player case;

a button that is spaced from the platform;

a collapsible mechanism coupled to the platform and the button, the collapsible mechanism including a plurality of discrete sections movable relative to one another to move the expandable socket between a collapsed configuration and an expanded configuration;

a first projection carried by the button and configured to engage a first portion of the collapsible mechanism, wherein the plurality of discrete sections is disposed radially inward of an outer surface of the first projection; and a second projection carried by the platform and configured to engage a second portion of the collapsible mechanism, wherein the plurality of discrete sections is disposed radially outward of an inner surface of the second projection.

3. The expandable socket of claim 2, wherein the collapsible mechanism has an outer diameter that tapers as the collapsible mechanism extends away from the button and toward the platform.

4. The expandable socket of claim 2, wherein the plurality of discrete sections comprises a plurality of at least partially coaxial rings, and wherein the coaxial rings are substantially concentrically arranged when the expandable socket is in the collapsed configuration.

5. The expandable socket of claim 2, wherein the plurality of discrete sections are movable relative to one another along a longitudinal axis.

6. The expandable socket of claim 2, wherein the first projection extends axially inward from an inner side of the button along a longitudinal axis.

7. The expandable socket of claim 2, wherein the first projection has an inner surface that curves radially inward as the projection extends inward, away from the button.

8. The expandable socket of claim 2, wherein the platform comprises an inwardly extending annular wall that defines the second projection.

9. The expandable socket of claim 2, wherein the second projection extends axially inward from an inner side of the platform along a longitudinal axis.

10. The expandable socket of claim 2, wherein the second projection has an outer surface and a detent is formed proximate to an end of the outer surface, the detent configured to engage the second portion of the collapsible mechanism.

11. The expandable socket of claim 2, wherein the second projection is positioned immediately adjacent an inner side of the button when the extendable socket is in the collapsed configuration.

12. The expandable socket of claim 2, further comprising a lock configured to releasably secure the expandable socket in the expanded configuration.

13. An expandable socket for attachment to a portable media player or a portable media player case, the expandable socket comprising:
   a platform adapted to engage to engage a portion of the portable media player or the protable media player case;
   a button that is spaced from the platform;
   a collapsible mechanism coupled to the platform and the button, the collapsible mechanism movable between a collapsed configuration to an expanded configuration, the collapsible mechanism including a plurality of at least partially coaxial rings that telescope within one another as the collapsible mechanism moves from the expanded configuration to the collapsed configuration;
   a first projection carried by the button and the configured to engage a first portion of the collapsible mechanism, wherein the plurality of at least partially coaxial rings is disposed radially inward of an outer surface of the first projection; and
   a second projection carried by the platform and configured to engage a second portion of the collapsible mechanism, wherein the plurality of at least partially coaxial rings is disposed radially outward of an inner surface of the second projection.

14. The expandable socket of claim 13, wherein the collapsible mechanism has an outer diameter that tapers as the collapsible mechanism extends away from the button and toward the platform.

15. The expandable socket of claim 13, wherein the first projection extends axially inward from an inner side of the button along a longitudinal axis.

16. The expandable socket of claim 13, wherein the first projection has an inner surface that curves radially inward as the projection extends inward, away from the button.

17. The expandable socket of claim 13, wherein the second projection extends axially inward from an inner side of the platform along a longitudinal axis.

18. The expandable socket of claim 13, wherein the second project has an outer surface and a detent is formed proximate to an end of the the outer surface, the detent configured to engage the second portion of the collapsible mechanism.

19. The expandable socket of claim 13, wherein the second projection is positioned immediately adjacent an inner side of the button when the extendable socket is in the collapsed configuration.

20. The extendable socket of claim 13, wherein the collapsible mechanism is movable between the expanded configuration and the collapsible configuration responsive to a user directly applying a force on the button.

21. An expandable socket for attachment to a portable media player or a portable media player case, the expandable socket comprising:
   a platform adapted to engage a portion of the portable media player or the portable media player case;
   a button that is spaced from the platform;
   a collapsible mechanism coupled to the platform and the button, the collapsible mechanism movable between a collapsed configuration and an expanded configuration, the collapsible mechanism including a plurality of at least partially coaxial rings that telescope within one another as the collapsible mechanism is moved from the expanded configuration to the collapsed configuration, wherein each of the rings frictionally engages at least one other ring of the plurality of at least partially coaxial rings to releasably lock the collapsible mechanism in the expanded configuration;
   a first projection carried by the button and configured to engage a first portion of the collapsible mechanism; and
   a second projection carried by the platform and configured to engage a second portion of the collapsible mechanism,
   wherein the plurality of at least partially coaxial rings is disposed radially inward of an outer surface of the first projection and radially outward of an inner surface of the second projection.

22. The expandable socket of claim 21, wherein the collapsible mechanism has an outer diameter that tapers as the collapsible mechanism extends away from the button and toward the platform.

23. The expandable socket of claim 21, wherein the first projection extends axially inward from an inner side of the button along a longitudinal axis, and wherein the second projection extends axially inward from an inner side of the platform along the longitudinal axis.

24. The expandable socket of claim 23, wherein the first projection has an inner surface that curves radially inward as the projection extends inward, away from the button.

25. The expandable socket of claim 23, wherein the second projection has an outer surface and a detent is formed proximate to an end of the outer surface, the detent configured to engage the second portion of the collapsible mechanism, and wherein the second projection is positioned immediately adjacent the inner side of the button when the extendable socket is in the collapsed configuration.

* * * * *

UNITED STATES PATENT AND TRADEMARK OFFICE
CERTIFICATE OF CORRECTION

PATENT NO. : 9,970,589 B2
APPLICATION NO. : 15/808076
DATED : May 15, 2018
INVENTOR(S) : Molly M. Hobbs et al.

Page 1 of 1

It is certified that error appears in the above-identified patent and that said Letters Patent is hereby corrected as shown below:

In the Specification

At Column 7, Line 40, "315" should be -- 314 --.

In the Claims

At Column 8, Line 15, "by the platform and arranged to" should be -- by the button and --.

At Column 8, Line 18, "and a," should be -- and ¶ a --.

At Column 8, Line 51, "expandable socket" should be -- collapsible mechanism --.

At Column 9, Line 8, "extendable socket" should be -- collapsible mechanism --.

At Column 9, Line 11, "expandable socket" should be -- collapsible mechanism --.

At Column 9, Line 17, "protable" should be -- portable --.

At Column 9, Line 51, "project" should be -- projection --.

At Column 10, Line 3, "extendable socket" should be -- collapsible mechanism --.

At Column 10, Line 27, "and a" should be -- and ¶ a --.

At Column 10, Line 53, "extendable socket," should be -- collapsible mechanism --.

Signed and Sealed this
Twenty-eighth Day of May, 2019

Andrei Iancu
*Director of the United States Patent and Trademark Office*